United States Patent
Starr et al.

(10) Patent No.: US 9,426,282 B2
(45) Date of Patent: Aug. 23, 2016

(54) METHOD AND APPARATUS FOR TRANSMISSION LINE TESTING

(71) Applicant: AT&T INTELLECTUAL PROPERTY I, L.P., Atlanta, GA (US)

(72) Inventors: Thomas J. J. Starr, Barrington, IL (US); Carlton L. Brown, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/242,489

(22) Filed: Apr. 1, 2014

(65) Prior Publication Data

US 2014/0211926 A1    Jul. 31, 2014

Related U.S. Application Data

(63) Continuation of application No. 11/954,398, filed on Dec. 12, 2007, now Pat. No. 8,737,572, and a continuation of application No. 11/297,626, filed on Dec. 7, 2005, now Pat. No. 7,336,770, and a (Continued)

(51) Int. Cl.
*H04M 1/24* (2006.01)
*H04M 3/30* (2006.01)
(Continued)

(52) U.S. Cl.
CPC .............. *H04M 3/301* (2013.01); *H04M 1/24* (2013.01); *H04M 3/306* (2013.01); *H04M 3/10* (2013.01); *H04M 3/308* (2013.01); *H04M 11/062* (2013.01)

(58) Field of Classification Search
CPC ..... H04L 43/50; H04L 47/10; H04L 12/2697; H04M 3/30; H04M 1/24

USPC ............... 379/1.04, 10.01, 21, 22.01, 27.03, 379/27.01, 27.02, 27.04, 27.07, 29.01; 370/247, 248, 249, 251, 252

See application file for complete search history.

(56) References Cited

U.S. PATENT DOCUMENTS

| 4,989,202 A | 1/1991 | Soto et al. |
| 5,128,619 A | 7/1992 | Bjork et al. |

(Continued)

FOREIGN PATENT DOCUMENTS

| EP | 1532800 A1 | 5/2005 |
| JP | 2004523021 A | 7/2004 |

(Continued)

OTHER PUBLICATIONS

International Search Report for International Application No. PCT/US03/19919, mailed on Aug. 14, 2003, 1 page.

(Continued)

*Primary Examiner* — Yosef K Laekemariam
(74) *Attorney, Agent, or Firm* — Toler Law Group, PC

(57) ABSTRACT

A method and device for transmission line testing are provided. The method includes applying, at a customer premises device, a test signal to a transmission line coupled to the customer premises device. The method further includes measuring, at the customer premises device, a reflection of the test signal. The method also includes determining, at the customer premises device, a characteristic of the transmission line based on the reflection of the test signal. The method includes determining, at the customer premises device, whether the transmission line supports a transmission service based on the characteristic. The method further includes generating an output, at the modem device, the output indicative of whether the transmission line supports the transmission service.

21 Claims, 3 Drawing Sheets

Related U.S. Application Data continuation of application No. 10/200,669, filed on Jul. 22, 2002, now Pat. No. 7,003,078, and a continuation of application No. 09/239,591, filed on Jan. 29, 1999, now abandoned.

(51) Int. Cl.
*H04M 3/10* (2006.01)
*H04M 11/06* (2006.01)

(56) References Cited

U.S. PATENT DOCUMENTS

| | | | |
|---|---|---|---|
| 5,461,318 A | 10/1995 | Borchert et al. | |
| 5,515,398 A | 5/1996 | Walsh et al. | |
| 5,583,874 A | 12/1996 | Smith et al. | |
| 5,672,974 A | 9/1997 | Turner | |
| 5,715,277 A | 2/1998 | Goodson et al. | |
| 5,778,050 A | 7/1998 | Park, II | |
| 5,802,446 A | 9/1998 | Giorgi et al. | |
| 5,805,669 A | 9/1998 | Bingel et al. | |
| 6,002,671 A | 12/1999 | Kahkoska et al. | |
| 6,014,425 A | 1/2000 | Bingel et al. | |
| 6,014,435 A | 1/2000 | Rosen | |
| 6,026,145 A | 2/2000 | Bauer et al. | |
| 6,067,646 A | 5/2000 | Starr | |
| 6,091,713 A | 7/2000 | Lechleider et al. | |
| 6,111,936 A | 8/2000 | Bremer | |
| 6,154,524 A | 11/2000 | Bremer | |
| 6,263,047 B1 | 7/2001 | Randle et al. | |
| 6,292,468 B1 | 9/2001 | Sanderson | |
| 6,366,644 B1 | 4/2002 | Sisk et al. | |
| 6,385,297 B2 | 5/2002 | Faulkner et al. | |
| 6,643,266 B1 * | 11/2003 | Pugaczewski | H04M 3/30 370/249 |
| 6,891,803 B1 * | 5/2005 | Chang | H04L 12/2697 348/192 |
| 7,003,078 B2 | 2/2006 | Starr et al. | |
| 7,336,770 B2 | 2/2008 | Starr et al. | |
| 2001/0043675 A1 | 11/2001 | Starr | |

FOREIGN PATENT DOCUMENTS

| | | |
|---|---|---|
| KR | 19990066505 A | 8/1999 |
| KR | 1020050072414 A | 7/2005 |
| WO | 2004010675 A1 | 1/2004 |

OTHER PUBLICATIONS

Translation of Japanese Office Action for Application No. 2004-523021, dated Aug. 4, 2009, 3 pages.
Translation of Korean Office Action for Application No. 10-2005-7001237, dated Aug. 31, 2007, 3 pages.
Baker, T., et al., "Telephone Access Network Measurements", 1998, Tektronix, Inc., pp. 1-74.

* cited by examiner

METHOD AND APPARATUS FOR TRANSMISSION LINE TESTING

CROSS-REFERENCE TO RELATED APPLICATION(S)

This application is a continuation of and claims priority from U.S. patent application Ser. No. 11/954,398, filed Dec. 12, 2007, and entitled "METHOD AND APPARATUS FOR TRANSMISSION LINE TESTING," which is incorporated herein by reference in its entirety and which is a continuation of U.S. Pat. No. 7,336,770, which is incorporated herein by reference in its entirety and which is a continuation of U.S. Pat. No. 7,003,078, which is incorporated herein by reference in its entirety and which is a Continuation-in Part Application of U.S. patent application Ser. No. 09/239,591, filed on Jan. 29, 1999.

BACKGROUND

1. Field of the Disclosure

This disclosure relates generally to methods and devices for transmission line testing.

2. Description of the Related Art

The characteristics of telephone lines vary greatly. Typical telephone lines connecting a customer premises to a public switch telephone network (PSTN) vary in terms of length, wire gauge, amount of bridged tap, background noise, loading coils, and other aspects. In addition, faults may be present along the telephone lines such as: a short circuit, an open circuit, conductor leakage, a short circuit to a power line, or induction interference from a power line. The operation and communications integrity of loop transmission systems depends on the telephone line characteristics. Loop transmission systems include a plain old telephone system (POTS), and digital subscriber line services such as an integrated services digital network (ISDN), high speed digital subscriber line (HDSL), very high speed digital subscriber line (VDSL), or asymmetric digital subscriber line (ADSL). These digital subscriber line services are commonly referred to as XDSL services.

Because the integrity of XDSL communications services depends on the quality of the transmission line connection, it is desirable to test the telephone line connecting a customer premises to the PSTN to determine whether the telephone line will support the desired transmission service. It is also desirable to test the line to diagnose the source of transmission faults or interference.

Presently, two methods are commonly employed to test telephone transmission lines: (1) central office or remote terminal automated line test systems, and (2) a dispatched technician with a hand-held test set. In the first case, a line test command is sent from a centralized loop maintenance system to a network terminating node (NTN) such as a local telephone switch or carrier system located in a central office or remote equipment site. In response, the NTN connects the line to be tested through a series of relays to a system that performs electrical measurements of the telephone transmission line. The results of these measurements are then reported back to the loop maintenance system.

In the second case, a technician is dispatched to connect a hand-held test set to the telephone transmission line to be tested at one of the following locations: (1) the central office main distributing frame, (2) the network interface device (MD) at the customer node, or (3) an intermediate point such as a serving area interface point. Using the hand-held test set, the technician measures the electrical characteristics of the line and reports the results of the test to the loop maintenance center. In either case, the electrical characteristics of the line are known, and a determination can then be made as to the type of digital communications services the telephone transmission line will support.

There are several shortcomings, however, with the present methods for qualifying telephone transmission lines for digital communication services. In the first case, transmission loops served from some network terminating nodes, such as digital subscriber line access multiplexers and digital loop carrier systems, may not provide metallic test access to the telephone transmission line or the line measurement unit. In the case where telephone service is not yet activated, the telephone transmission line may not be connected to an NTN at all. In these situations, it would not be possible to perform an automated line test from the network-end of the line. Furthermore, transmission loops which are connected to an NTN with a metallic test bus and a line measurement unit, may only respond to test frequencies within the sub-4 kHz band due to bandwidth limitations of the test bus or the line measurement unit. In addition, background interference noise at the customer node may be difficult to observe with testing equipment located only at the NTN.

Dispatching a technician to test the telephone transmission line has the obvious shortcoming of increasing the time and expense to provide digital communication services to customers. This results from the need for personnel to perform these tests, and the need to provide technicians with testing equipment.

The present disclosure overcomes the shortcomings of present telephone transmission line testing methods by providing a modem at the customer premises for testing and qualifying the customer connection to the PSTN for XDSL communication services.

DESCRIPTION OF THE DRAWINGS

Figure 1:
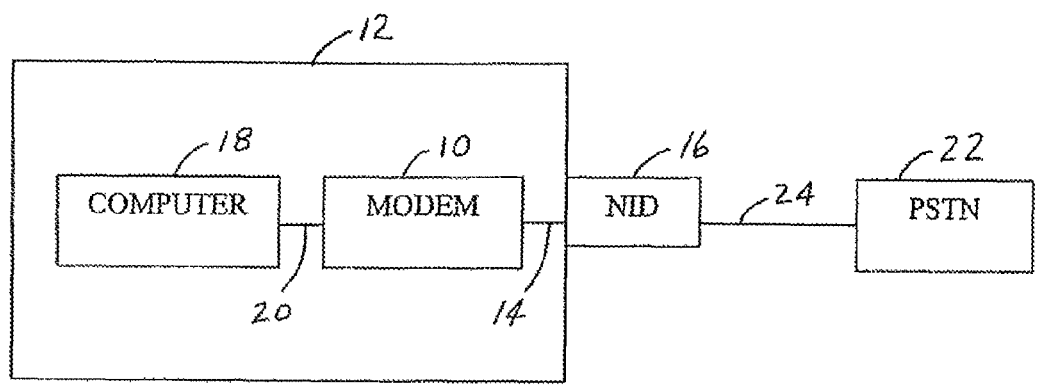
FIG. 1 is a schematic block diagram of one embodiment of the present invention used in connection with a computer located at a customer premises.

Referring to FIG. 1, there is shown a schematic block diagram of an embodiment of the present method of testing a telephone transmission line. The system shown in FIG. 1 includes a modem 10 located at the customer premises 12 which is connected by way of transmission line 14 to the network interface device 16 at the customer premises 12. Transmission line 14 will typically include the modem line connected to a common telephone wall jack, and associated wiring from the wall jack to the network interface device 16. Alternatively, transmission line 14 can include the modem line connected directly into the network interface jack in the NID 16. It is contemplated that the modem 10 will typically be part of a digital communications device such as a computer 18 or will be connected to such a device as shown in FIG. 1 by transmission line 20. XDSL modems are commonly included in today's personal computer systems. Unlike customer-end XDSL modems to date, however, modem 10 includes wideband loop testing and reporting functions. Between the network interface device 16 at the customer premises 12 and the public switch telephone network (PSTN) 22, is the telephone transmission line 24 to be tested. Of course, the PSTN could also represent a digital network.

Computer 18 is shown as part of a representative digital communications system at a customer premises 12. The modem 10 is typically a necessary part of computer 18 which allows computer 18 to transmit and receive digital signals over telephone transmission line 24. For purposes of line testing, however, computer 18 is not necessary if modem 10 is equipped with a user interface for displaying the results of the telephone transmission line test. It is to be understood that computer 18 is shown for illustration purposes and could be interchanged, for example, with other equipment that generates a communications signal to be sent over the telephone transmission line 24.

Figure 2:
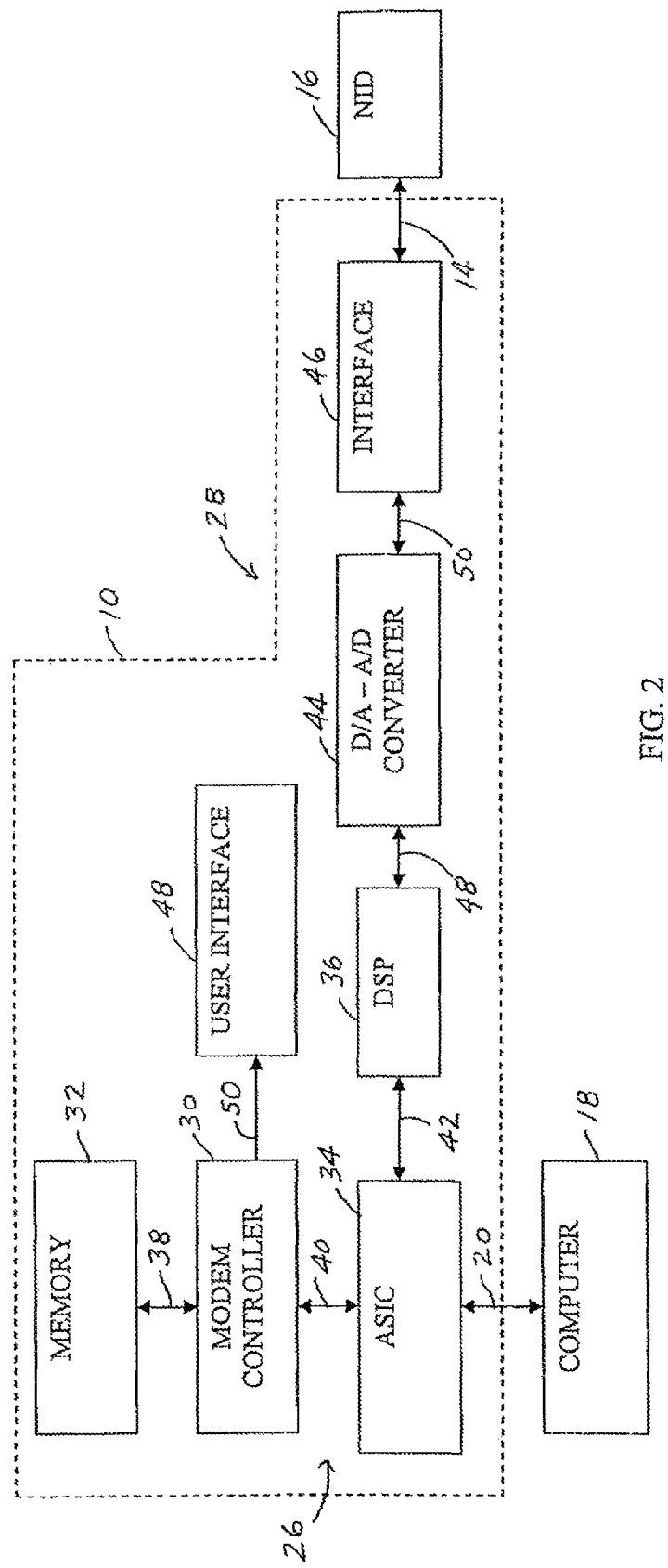
FIG. 2 is a schematic block diagram of one embodiment of the modem for use in the telephone line testing scenario of FIG. 1.

Referring to FIG. 2, an embodiment of the modem 10 comprises a transmitter/receiver 26 and direct access arrangement (DAA) 28. The transmitter/receiver 26 includes a modem controller 30 such as a microprocessor, associated memory 32, application specific integrated circuit (ASIC) 34, and a digital signal processor (DSP) 36. These components communicate along signal paths 38, 40 and 42.

The direct access arrangement 28 includes a digital-to-analog (D/A) and analog-to-digital (A/D) converter 44 and telephone interface circuitry 46. The converter 44 communicates with the DSP 36 and interface 46 along signal paths 48 and 50, respectively. The interface 46 transmits signals to and receives signals from the network interface device 16 along transmission line 14.

The modem controller 30, memory 32, ASIC 34, and DSP 36 define a transmitter for generating test signals on telephone transmission line 24. Modem controller 30, memory 32, ASIC 34 and DSP 36 also define a receiver for detecting signals in response to test signals transmitted to telephone transmission line 24.

In addition, modem 10 preferably includes a user interface 48 in communication with modem controller 30 along signal line 54 for displaying the telephone transmission line test results to a user.

In operation, customers who desire DSL services would connect the modem 10 to a wall jack at the customer premises or the network interface jack in the network interface device 16. The modem 10 performs a series of telephone line tests to qualify the line for its desired use and/or to diagnose the source of transmission interference. The test results are presented to the user by the user interface 52 or, alternatively, can be transmitted to, for example, computer 18 for display, or along transmission line 24 to a communications service provider. In this manner, the telephone transmission line 24 can be pre-qualified for the desired communications service.

To display an output indicative of the electrical characteristics of telephone transmission line 24, the modem 10 performs a series of tests. The testing sequence and logic is stored in memory 32 and executed by modem controller 30 in cooperation with transmitter/receiver 26 and DAA 28. The following functions are carried out by the modem 10 in qualifying the telephone transmission line 24. One function is line monitoring which consists of measuring background noise power in one or more frequency bands in a frequency range of approximately 0 Hz to 5 MHz. Another function is measurement of AC or DC voltage between the tip and ring, tip and ground, and ring and ground terminals of the telephone transmission line 24. Stimulus and response testing is also performed by the modem 10 in the form of transmitting test tones, receiving response signals in response to the test tones, and analyzing the amplitude and phase of the signal reflections from the transmission line 24. Additionally, modem 10 transmits test pulses, receives response signals in response to the test pulses, and analyzes the amplitude and delay of the pulse reflections from the transmission line 24. Additional functionality includes measurement of resistance between the tip and ring, tip and ground, and ring and ground terminals of transmission line 24, as well as measurement of the capacitance between the tip and ring terminals of transmission line 24.

Depending upon the communication service desired by the customer, a series of measurements could be performed with some of the tests performed more than once, or not at all, depending on the system configuration or the results of earlier tests. In addition, or alternatively, during a test sequence, the end-user could be instructed by the modem controller 30 via the user interface 48 to perform certain actions such as to place telephones on or off hook.

At the conclusion of the sequencing and analysis, a transmission line quality value is developed as a function of the test results.

One scenario for deriving the line quality value is as follows. The user is asked to indicate the type of DSL transmission system for which the line analysis is being performed. For example: HDSL, ADSL, or ISDN. From this, assumptions are made for the typical transmitted frequency band(s), signal power, modulation method, and coding, among other things.

The broadband attenuation of the line is estimated by applying a voltage step to the line 24 and measuring the time-constant of the resulting current flow. The time-constant estimates the line capacitance, from which the line length is inferred. The estimation of the broadband attenuation could further be refined by applying a short voltage pulse to the line and measuring the number and amplitude of the observed echoed pulses. From these pulses, the presence of bridged taps can be ascertained. An additional attenuation allowance would then be made for each bridged tap. By applying a single or multiple tone frequency sweep to the line and observing the reflected signals, nonlinear distortion and the presence of a loading coil can also be detected. In addition, the background line noise would be preferably measured in one or more frequency bands. If the line response indicates the presence of a loading coil, then the line is not suitable for broadband DSL service. This would be indicated to the user or service-provider.

With knowledge of the nominal transmitted signal power and the estimated line attenuation from the measurements mentioned above, the received signal power is predicted. The noise power is predicted from the measured background noise, and the measured nonlinear distortion. A predicted signal-to-noise ratio (SNR) value is then estimated. For a known transmission method (modulation type, transmit power, coding type, bandwidth) the achievable bit-rate is derived from the SNR. For asymmetric transmission systems (such as ADSL), a SNR estimate is derived separately for the upstream and downstream directions. Thus, a separate bit-rate capacity estimate is provided for each direction of transmission.

This bit-rate capacity is then represented as a line quality value which is then displayed to the end user by way of the user interface 48. The customer could then relay the line test results to the communications service provider. Alternatively, the test results could be transmitted to the service provider over transmission line 24.

With the preferred implementation of the line testing method, line testing would be performed in a single-ended manner. In other words, the test is conducted at the customer premises only, and no testing equipment is required at the other end of telephone transmission line 24. Of course, as an alternative implementation, a double-ended test could be performed involving coordinating testing functions at both the customer end of telephone transmission line 24 and the network end of telephone transmission line 24. In the double-ended testing scenario, test signals can be transmitted and received by the modem 10 and the PSTN 22.

The testing procedures described above can be initiated by either the end user at the customer premises or by way of an initiation message from the service provider or the local network provider via the DSL path or dial-up voice band modem connection.

Figure 3:
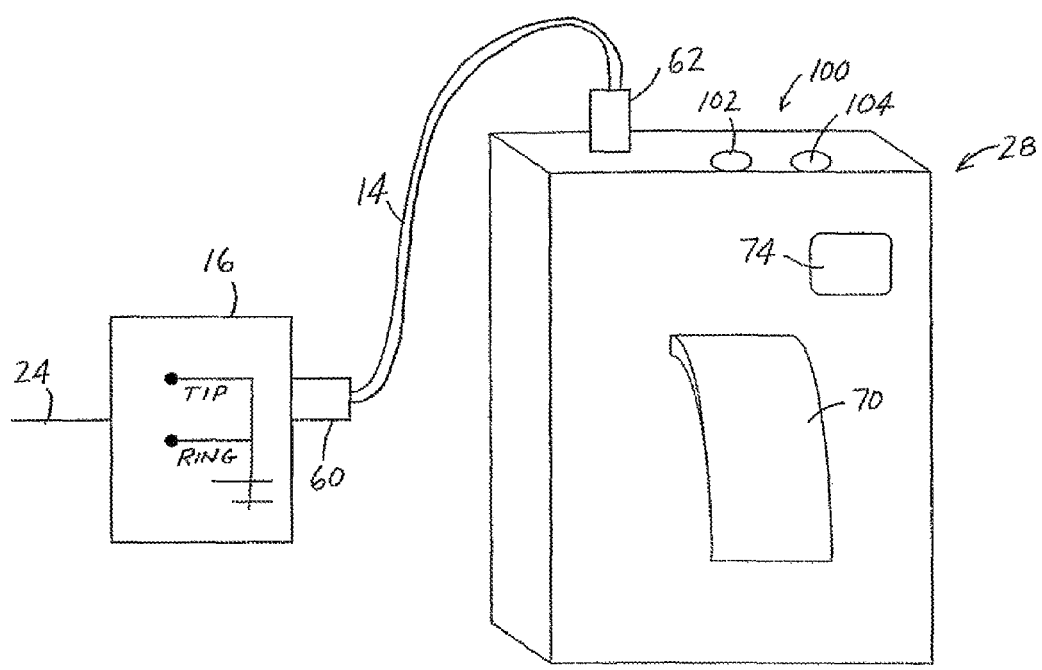
FIG. 3 is a perspective view of one embodiment of a direct access arrangement testing device according to the present invention.

Referring now to FIG. 3, there is shown a perspective view of one embodiment of a direct access arrangement device 28 according to the present disclosure. The device is a hand-held test set, connected by way of a transmission line 14 to a network interface device (NID) 16 at the customer premises. In the example shown in FIG. 3, the transmission line is a standard telephone line with RJ-11 connectors 60, 62 for connecting to the NID 16 and PSTN by way of the telephone transmission line 24. If the device is being used at the network central office, a different type of communication cable may be used to interface with the main distribution frame (MDF) or switch location associated with a particular customer's loop.

The test set is small in size and can be hand-held. For example, the set may be 7.times.4.times.2 inches or less. For easy portability, a belt-clip 70 can be affixed to one side of the device. Preferably, the device is battery powered, and activated with a power switch 74 after connection. The user interface 100 includes two indicators such as LEDs 102, 104 which preferably can each indicate red or green and can flash on and off or be lit continuously.

In operation, the test set qualifies a customer loop for XDSL communications, the loop being from between the ADSL termination unit-remote (ATU-R) to the ATU-Central Office (ATU-C). Once connected, the test set performs at least several of the line tests discussed above, including attempting to synchronize as an ADSL modem. The test set is capable of inter-operating with the Alcatel 1000 and/or Cisco 6100 digital subscriber loop access multiplexers (DSLAMs), for example.

Upon power-up, LED 104 indicates that initialization is complete and power is sufficient (solid green light), power is low (flashing green light), or that the set has failed its power-up initialization tests (solid or flashing red light). If power-up is successful, the test set continues into the testing phase. At least several of the tests outlined above are performed including testing for an open circuit on either the tip or ring terminal That is, tip to ground, ring to ground and tip to ring voltages are determined During the testing phase, while the unit is performing the tests, LED 102 is blinking green to indicate that the unit is active. If all of the tests are successful and the unit has determined that the customer loop qualifies for XDSL communications, LED 102 is activated to be solid green. If the tests have failed, the indicator is activated as a solid or flashing red light. However, if the open circuit test has failed, i.e., there is insufficient voltage detected between the tip and ring circuits, the indicator alternates flashing green and red. The alternating green/red signal thus indicates a possible open loop on the customer circuit. If the open loop issue is resolved, the customer loop may still qualify for XDSL communications services. In this way, the test unit acts as a go/no-go gauge for qualifying a customer loop either at the customer premises, or at the central office. When performed at the customer premises, the unit may communicate either the test passed, test failed, or test failed with possible open loop results to the central office.

The hand-held test set of FIG. 3 thus provides a simple, effective device for qualifying a customer loop for XDSL communication services. Of course, the user interface could take many forms, and others are contemplated by the present invention. Preferably, however, the interface should communicate at least whether the test has passed or failed and whether a possible open circuit condition exists. One indication could accomplish this by a solid, slow blinking and fast blinking signal, respectively, for example. The test set of FIG. 3 qualifies the customer loop by indicating whether the customer modem will be able to synchronize with the network. It does not test for optimum communications rates.

While the invention has been described in connection with one or more embodiments, it is to be understood that the invention is not limited to these embodiments. On the contrary, the invention covers all alternatives, modifications and equivalents as may be included within the scope and spirit of the appended claims.

What is claimed is:

1. A method comprising:
    applying, at a customer premises device, a test signal to a transmission line coupled to the customer premises device;
    measuring, at the customer premises device, a reflection of the test signal;
    determining, at the customer premises device, a characteristic of the transmission line based on the reflection of the test signal;
    determining, at the customer premises device, whether the transmission line supports a transmission service based on the characteristic; and
    generating an output at the customer premises device, the output indicative of whether the transmission line supports the transmission service.

2. The method of claim 1, wherein the characteristic includes an estimated achievable data rate of the transmission line.

3. The method of claim 1, wherein generating the output includes initiating display of an indicator of service qualification.

4. The method of claim 1, wherein after the customer premises device determines that the transmission line supports the transmission service, the customer premises device enables a computing device coupled to the customer premises device to send and receive data via the transmission line.

5. The method of claim 4, wherein the customer premises device and the computing device are incorporated into a personal computer.

6. The method of claim 1, wherein the customer premises device is located within a customer premises, and wherein the customer premises device includes a modem.

7. The method of claim 6, wherein the modem enables a computing device distinct from the customer premises device to communicate with a remote server via a digital network.

8. The method of claim 1, further comprising performing a transmission line test stored at a memory of the customer premises device, wherein the characteristic is determined based on a result of the transmission line test.

9. The method of claim 8, wherein the transmission line test includes:
    measuring background noise power in a frequency band at a connection to the transmission line;
    measuring a voltage between a first conductor and a second conductor of the transmission line; and measuring a capacitance between the first conductor and the second conductor of the transmission line.

10. The method of claim 1, wherein the test signal includes a tone, and wherein the characteristic is based on an amplitude and a phase reflection of the tone.

11. The method of claim 1, wherein the test signal is a pulse signal, and wherein the characteristic is based on an amplitude and a delay of a reflection of the pulse signal.

12. The method of claim 1, further comprising:
applying a voltage step to the transmission line;
determining a time constant of the transmission line based on a current flow associated with the voltage step;
estimating a capacitance of the transmission line based on the time constant;
estimating a length of the transmission line based on the capacitance; and
generating an estimated broadband attenuation of the transmission line based on the length,
wherein the characteristic is based on the estimated broadband attenuation.

13. The method of claim 12, wherein the test signal includes a voltage pulse, the method further comprising:
determining that a bridge tap exists at the transmission line based on a number and an amplitude of reflected pulses; and
adjusting the estimated broadband attenuation based on the determination that the bridge tap exists at the transmission line.

14. The method of claim 1, wherein the test signal includes a tone frequency sweep, the method further comprising determining non-linear distortion associated with the transmission line based on the reflection, wherein the characteristic is based on the non-linear distortion.

15. The method of claim 1, further comprising:
generating a predicted signal power of a signal received at the customer premises device based on a nominal signal power and based on an estimated broadband attenuation;
generating a predicted noise power associated with the transmission line based on measured background noise; and
generating a predicted signal-to-noise ratio based on the predicted signal power and the predicted noise power,
wherein the characteristic is based on the predicted signal-to-noise ratio.

16. The method of claim 1, wherein determining the characteristic is performed independent of signals received by the customer premises device from other network devices via the transmission line.

17. An apparatus comprising:
a transmission line interface to connect to a transmission line;
a processor; and
a memory storing instructions that, when executed by the processor, cause the processor to perform operations comprising:
applying, at a customer premises device, a test signal to the transmission line coupled to the customer premises device;
measuring, at the customer premises device, a reflection of the test signal;
determining whether the transmission line supports a transmission service based on the reflection of the test signal; and
generating an output indicative of whether the transmission line supports the transmission service.

18. The apparatus of claim 17, wherein the processor and the memory are within a modem within the customer premises device.

19. A processor-readable storage device storing instructions that, when executed by a processor, cause the processor to perform operations comprising:
applying, at a customer premises device, a test signal to a transmission line coupled to the customer premises device;
measuring, at the customer premises device, a reflection of the test signal;
generating an estimated achievable data rate of the transmission line based on the reflection of the test signal;
determining whether the transmission line supports a transmission service based on the estimated achievable data rate;
generating an output indicative of whether the transmission line supports the transmission service; and
after generating the output, enabling a computing device to send and receive digital signals via the transmission line.

20. The processor-readable storage device of claim 19, wherein the operations further comprise:
generating a predicted signal power of a signal based on a nominal signal power and on an estimated broadband attenuation;
generating a predicted noise power associated with the transmission line based on measured background noise; and
generating a predicted signal-to-noise ratio based on the predicted signal power and the predicted noise power, wherein the estimated achievable data rate is further based on the predicted signal-to-noise ratio.

21. The method of claim 3, wherein the indicator of service qualification is displayed using at least one indicator light.

* * * * *